US009461808B2

(12) United States Patent
Cariou et al.

(10) Patent No.: US 9,461,808 B2
(45) Date of Patent: Oct. 4, 2016

(54) METHOD OF TRANSMITTING DATA PACKETS, AND CORRESPONDING STATIONS AND COMPUTER PROGRAM

(75) Inventors: Laurent Cariou, Rennes (FR); David Bernard, Marcille Raoul (FR)

(73) Assignee: ORANGE, Paris (FR)

( * ) Notice: Subject to any disclaimer, the term of this patent is extended or adjusted under 35 U.S.C. 154(b) by 144 days.

(21) Appl. No.: 14/129,142

(22) PCT Filed: Jun. 22, 2012

(86) PCT No.: PCT/FR2012/051435
§ 371 (c)(1),
(2), (4) Date: Apr. 10, 2014

(87) PCT Pub. No.: WO2012/175891
PCT Pub. Date: Dec. 27, 2012

(65) Prior Publication Data
US 2014/0247777 A1 Sep. 4, 2014

(30) Foreign Application Priority Data

Jun. 24, 2011 (FR) ...................................... 11 55601

(51) Int. Cl.
*H04W 4/00* (2009.01)
*H04L 5/00* (2006.01)
*H04W 74/08* (2009.01)
*H04W 72/04* (2009.01)
*H04W 84/12* (2009.01)

(52) U.S. Cl.
CPC .......... *H04L 5/0092* (2013.01); *H04W 72/044* (2013.01); *H04W 74/0816* (2013.01); *H04W 84/12* (2013.01)

(58) Field of Classification Search
CPC combination set(s) only.
See application file for complete search history.

(56) References Cited

U.S. PATENT DOCUMENTS

| 2004/0047314 A1 | 3/2004 | Li |
| 2008/0063106 A1 | 3/2008 | Hahm et al. |
| 2012/0320887 A1* | 12/2012 | Chintalapudi .... H04W 74/0841 370/338 |

FOREIGN PATENT DOCUMENTS

WO    2009050656 A1    4/2009

OTHER PUBLICATIONS

English translation of the Written Opinion of the International Searching Authority, dated Dec. 24, 2013 for corresponding International Application No. PCT/FR2012/051435, filed Jun. 22, 2012.
International Search Report dated Oct. 15, 2012 for corresponding International Application No. PCT/FR2012/051435, filed Jun. 22, 2012.
French Search Report dated Feb. 17, 2012 for corresponding French Application No. 1155601, filed Jun. 24, 2011.

* cited by examiner

*Primary Examiner* — Frank Duong
(74) *Attorney, Agent, or Firm* — David D. Brush; Westman Champlin & Koehler, P.A.

(57) ABSTRACT

A method and device are provided for transmitting data packets to an access network with sharing of a multiband channel among stations. A first band is referred to as a "transmission" band, and a second band is referred to as a "signaling" band. A station accesses the channel for transmitting data of a stream after using a counter to decrement a backoff value. The method includes: receiving backoff counts sent successively over the signaling channel by the various stations relating to their various streams; comparing the backoff counts with one another in order to detect identical values; and in the event of there being identical values between a plurality of stations, determining at least one new backoff count value that is different from all the others.

10 Claims, 5 Drawing Sheets

METHOD OF TRANSMITTING DATA PACKETS, AND CORRESPONDING STATIONS AND COMPUTER PROGRAM

CROSS-REFERENCE TO RELATED APPLICATIONS

This application is a Section 371 National Stage Application of International Application No. PCT/FR2012/051435, filed Jun. 22, 2012, which is incorporated by reference in its entirety and published as WO 2012/175891 on Dec. 27, 2012, not in English.

FIELD OF THE INVENTION

The present invention relates to the field of telecommunications. Within this field, the invention relates more particularly to the field of radio communications, also known as wireless communications, and including wireless fidelity (WiFi) networks that are standardized by IEEE standards 802.11 et seq. Those standards guarantee interoperability between pieces of wireless communications equipment that comply therewith.

Below in this document, the term "WiFi" should be understood as covering the entire field of radio communication.

The invention is described in the context of a WiFi network with infrastructure in which the stations set up communications by means of an access point. Depending on the implementation, the invention may also be performed by an ad hoc network.

More precisely, the invention relates to avoiding collisions between pieces of WiFi equipment, and it relates more particularly to a mechanism for transmitting data packets suitable for use in a WiFi system.

The term "equipment" is used herein to mean any apparatus forming part of a basic service set (BSS) made up of an access point and of the stations associated with the access point, i.e. the stations situated in the coverage zone of the access point.

PRIOR ART

When a piece of WiFi equipment has data for transmission, it needs to access the transmission channel. Access to the transmission channel in a WiFi system may be of the type known as carrier sense multiple access-collision avoidance (CSMA-CA), as introduced and described in the standard 802.11-2007, paragraph 9.1 "MAC architecture", 9.1.1 "DCF". The CSMA-CA mechanism as shown in FIG. 1 shares access to a radio channel on the so-called "contention" principle: each piece of equipment STA1, STA2, STA3, STA4, STA5 needs to listen to ensure that the channel is free (i.e. that no signal is being transmitted or received over the channel) during a waiting period referred to as a "backoff" period, prior to transmitting data. In practice, during the contention period CW, the access point and each of the stations all decrement d1 their respective backoff counts Bck associated with the packets Fr waiting in their respective queues, while waiting for the channel to become free.

The access process consists in initializing a backoff time Bck by each station performing a random draw for each stream. During each contention period, each station listens to the channel during the remaining duration (Bck-d1) of its own backoff count.

If the channel becomes occupied before the end of this duration, then the station suspends decrementing its own counter and waits for a new contention period before continuing to decrement its own backoff count.

If at the end of this duration the channel is free, then the station can take the channel and transmit.

It can also happen that a plurality of WiFi access points are occupying the same frequency band in the same three-dimensional space. There are then said to be overlapping basic service sets. Under such conditions, a radio channel or frequency band needs to be shared between the various basic service sets. This has conventionally been done by using the above-described CSMA-CA access technique.

An improved access technique referred to as enhanced distributed channel access (EDCA) is defined in the same standard, Chapter 9, "MAC sublayer functional description", paragraph 9.9.1 "HCF contention-based channel access (EDCA)" for pieces of equipment (stations and AP) that are compatible with managing quality of service (QoS). In this technique, each piece of equipment needs to listen to ensure that the channel is free (i.e. that no signal is being transmitted or received over the channel) for a duration that is variable, corresponding to an arbitration interframe space (AIFS) that may vary as a function of the type of stream plus a random backoff duration, prior to transmitting data.

In this technique, quality of service is based on using shorter backoff count periods for streams having higher priorities. Thus, the priority of a stream is a function of various classes of service. For example, the "voice" class of service benefits from greater probability of accessing the channel than does the "best effort" class of service, since the backoff is drawn randomly by the equipment using time intervals of different values as a function of the class of service.

QoS management in the EDCA technique works quite well providing the load on the system is not too great.

Nevertheless, once the load increases, collision can arise, in particular because:

the same backoff value can be drawn randomly by two different stations (they will therefore both access the channel at the same instant); or the stations are stations that are hidden from each other (that cannot detect signals from the other station).

When a collision occurs between two stations, a known solution consists in increasing possible backoff values (by doubling the values of the limits on the intervals that can be selected, which mechanism is known as "exponential backoff"), so as to reduce the probability of collision. That has the drawback of increasing access time to the channel, and thus of increasing jitter, which is penalizing for quality of service.

SUMMARY OF THE INVENTION

The invention proposes an advantageous novel solution in the form of a method of transmitting data packets to an access network with sharing of a multiband channel among stations, a first band being a "transmission" band, and a second band being a "signaling" band, a station accessing the channel for transmitting data of a stream after using a counter to decrement a backoff value.

Thus, the invention provides a method of transmitting data packets to an access network with sharing of a multiband channel among stations, a first band being a "transmission" band, and a second band being a "signaling" band, a station accessing the channel for transmitting data of a stream after using a counter to decrement a backoff value. The method comprises:

a reception step of receiving backoff counts sent successively over the signaling channel by the various stations relating to their various streams;

a comparison step of comparing the backoff counts with one another in order to detect identical values; and in the event of there being identical values between a plurality of stations, a determination step of determining at least one new backoff count value that is different from all the others.

A station sends its backoff count(s) over the signaling band following drawing/allocation of a new backoff value for one of its streams. A method of the invention diminishes or even eliminates the risks of collision while accessing a channel that is shared among stations by eliminating any values that are identical to any of the other backoff values among the stations. The term "identity" may be understood as including quasi-identity, e.g. with a difference of ±1, in order to accommodate possible differences between the clocks of the various stations.

WiFi equipment performing a method of the invention is multiband equipment, having a band that is more particularly used for signaling and another band that is more particularly used for transmitting data. The signaling band is typically selected in advantageous manner so as to have radio coverage that is greater and energy consumption that is less than for the data transmission band, with the above-described exchanges in the method taking place over the signaling band. The band for data transmission is advantageously selected to have a data rate that is faster than that of the band for signaling.

In an implementation of the invention, one of the stations is an access point in which the reception, comparison, and determination steps take place. In this implementation, the method further comprises:

a step of the access point broadcasting a backoff request; and a step of the access point sending at least one new backoff count value to the station associated with the backoff count.

In this configuration, one of the stations sharing the channel is an access point to a telecommunications network. In a first implementation, the access point broadcasts a request over the signaling band to the stations that share the channel, calling for them to return their backoff values. This implementation is advantageous in that it is the access point that triggers the backoff responses and it can therefore time this triggering in a manner that is appropriate relative to channel utilization. The access point evaluates the possibility of collision by comparing the received backoff values with one another, and in the event of there being identity or near identity between a plurality of values, it modifies those values so that there are no longer any values that are identical. Thereafter the access point sends the modified values to the corresponding stations; the access point thus forces backoff values to be modified so as to avoid collisions.

In an implementation of the invention, the method is such that every backoff count associated with a queue of a station, and from which the data that was previously stored therein has been sent over the transmission channel by the station, is no longer taken into account in the comparison by the access point.

In this implementation, the access point optimizes the memory space needed for tracking the backoff counts by not comparing any backoff count for which the data that was queuing when the backoff value was allocated has subsequently been sent.

In an implementation of the invention, the steps of broadcasting the backoff request, of reception, of comparison, of determination, and of sending a new count value as performed by the access point take place during a period in which the transmission channel is occupied by a single station.

In a particular configuration, the backoff responses and the processing by the access point take place while the transmission channel is occupied. I.e. they take place during a transmit opportunity (TxOP) period during which one of the stations is occupying the data transmission band. In this configuration, the access point recovers the value of the TxOP field from the data frames that are being sent, which field gives the period during which the transmission channel will be occupied by the data being transmitted. This is particularly advantageous in that the backoff values received by the access point correspond to the count values in the stations throughout the time the transmission channel is occupied. There is no need for the access point to modify any of the received backoff values prior to the step of comparing the backoff values, since occupation of the transmission channel ensures that there is no contention period and therefore suspends any decrementing of the backoff counts by the stations.

It is therefore preferable for the TxOP duration to be longer than the duration of the forthcoming data exchanges in the signaling band so as to ensure that no other contention stage can take place before the new backoff values have been returned. Otherwise, the access point AP needs to take contention stages into account in order to update the returns that have taken place. Under such circumstances, the backoff responses need to include a field indicating whether the backoff value as transmitted is as it was before the most recent contention period or is more recent (taking account of the beginning of the backoff response transmission).

In an implementation of the invention, the access point decrements the backoff values at each contention stage and suspends such decrementation as soon as transmission begins in the transmission channel.

In this implementation, the access point compares the various backoff values while taking into account the decrementation that has been carried out in the data transmission band since the backoff values were returned. The backoff values held by the access point are consequently identical at all times to the values of the backoff counts of the stations. When a backoff value becomes zero, i.e. the data in the corresponding queue is about to be transmitted, the access point may advantageously cease to take it into account, thereby optimizing its own backoff tracking.

In an implementation of the invention, one of the stations is an access point in which the reception, comparison, and determination steps take place. In this implementation, the method further comprises:

a step of the various stations sending backoff counts over the signaling band; and a step of the access point sending the new backoff count value.

In this implementation, one of the stations sharing a given channel is an access point to a telecommunications network. The stations other than the access point that are sharing the same channel send their own backoff values in succession. This implementation is advantageous firstly because occupation of the signaling channel by the signals sent by the access point is limited, and secondly because the backoff values can be returned very quickly after a new value has been allocated to a counter in a station. Thus, the access point can compare the backoff values in centralized manner immediately on receiving a backoff value and generally without any prior correction; the very short lapse of time between a new backoff value being allocated to a backoff counter in a station and that backoff value being received by the access point greatly decreases any possibility of that counter having already begun to decrement in the station.

In an implementation of the invention, the method further comprises:
- a step of the stations broadcasting the backoff counts over the signaling band;
- a step of the stations receiving the broadcast backoff counts;
- a step of the stations evaluating the probability of collisions; and
- as a function of the probability of collisions, a step of modifying backoff counts that are identical.

In this configuration, the various stations spontaneously broadcast the respective value(s) of the backoff count(s) associated with their queue(s) to the entire cell (AP, STA) over the signaling channel. Typically, this broadcasting happens as soon as a new value is allocated to one of the streams of a station, typically each time a new count value is drawn, where values are generally drawn randomly. If a station has a plurality of queues, then it broadcasts a backoff value for each non-empty queue. Each station may receive the various backoff values from the other stations sharing the same channel, providing the sending and receiving stations are not stations that are hidden from each other. Each station compares the backoff values it has received with the values of its own counts. In the event of there being values that are identical between its own counts and a received backoff value, the station modifies the value of its own count so that all of the values are different. Thus, the method makes it possible to decrease the probability of collisions by each station modifying its own backoff counts if any of them is equal to a backoff count broadcast by another station. This can be performed equally well in a network having infrastructure and in an ad hoc network.

By taking account of the decrementation that has been carried out in the data transmission band since the backoff values have been received from other stations, a station can determine which backoff values are going to generate collisions on the next occasion it draws a backoff value as a result of a new packet arriving in one of its queues. If it is very probable that a drawn backoff value will lead to a collision, then the station can draw another value, or else it can adjust the backoff value it has already drawn by incrementing it or decrementing it. In one particular implementation, only incrementing is authorized.

The invention also provides a station for transmitting data packets. The station is more particularly intended for an access network with sharing of a multiband channel among various stations, a first band being a "transmission" band, and a second band being a "signaling" band, a station accessing the channel for transmitting data of a stream after using a counter to decrement a backoff value.

A station of the invention comprises:
- transceiver means for transmitting and receiving data packets via the multiband transmission channel;
- memory means for storing backoff counts sent in succession by the various stations sharing the multiband channel and relating to their various streams;
- comparator means for comparing the backoff counts in order to detect values that are identical between a count of the station and a count of some other station; and
- in the event of there being values that are identical, means for determining at least one new backoff count value for the station that is different from all the other values.

For example, the access network may be a WiFi network having a transmission band that corresponds to a 5 gigahertz (GHz) band with reference to a network in compliance with the IEEE 802.11n standard together with a signaling band that corresponds to a 868 megahertz (MHz) to 868.6 MHz band with reference to a network in compliance with the IEEE 802.11ah standard. The WiFi network has an access point AP and at least two stations. The IEEE 802.11ad standard defines a multiband mode that is applicable to all WiFi systems (11a, b, g, n, ac, ad, af, ah, . . . ) even if its definition is to be found only in this standard with specific bands.

A WiFi station of the invention receives the various backoff values sent by the other stations forming part of the same cell (or same BSS), or indeed stations belonging to some other BSS, referred to as an OBSS. The station compares these received backoff values with the values of its own counts. When one of these counts is identical to a received backoff value, then the station determines a new value for its own count that is different from all of the received backoff values. Thus, the risk of a station entering into collision with another station when accessing the shared multiband channel is greatly diminished, or even close to zero.

Such a station is adapted in particular to performing the above-described transmission method. By way of example, it may be an access point or a WiFi station.

In an embodiment of the invention, the station further comprises:
- means for broadcasting a backoff request over the signaling channel; and
- means for sending the at least one new backoff value over the signaling channel.

The station in this embodiment is typically an access point adapted to limit or even to avoid collisions between stations while accessing the shared multiband channel by eliminating backoff values that are identical among the queues of the stations.

In the invention, the broadcasting or the exchange of information in the signaling band may take place using new fields created in the MAC layer and then put into a frame: a "backoff request" frame, a "backoff response" frame, or a "backoff modif" frame.

The "backoff request" frame typically comprises:
- the identifier of the data transmission band corresponding to the backoff counts; and
- optionally, the identifiers of all of the stations that are to respond and the order in which they are to respond, or the identifier of a group constituted by those stations (in which case the order of their responses constitutes one of the initial settings of the WiFi system) or an indication that a response is to be made in broadcast mode.

Typically, the "backoff response" frame comprises:
- the identifier of the data transmission band in question;
- the identifier of the stream concerned by the backoff (or if there are several streams, their identifiers in concatenated manner); and
- the backoff value and the class of service used by the associated stream or the sum of the backoff value plus the arbitration interframe space (AIFS) of the class of service used by the stream (AIFSN+backoff).

Typically, the "backoff modif" frame comprises:
the identifier of the data transmission band in question;
the identifier of the stream concerned by the backoff modification (or if there are several streams, their identifiers in concatenated manner); and
the new backoff or the modification imposed on the backoff (+1, −1, . . . ) or the new backoff+AIFS sum for the class of service used by the stream.

For each of the implementations of the invention, it is also possible for the information transmitted in the signaling band to be transmitted by making use of PLCP headers (as determined in the physical (PHY) layer) in order to reduce the size of the transmissions and the extent to which they occupy the channel. For example, the VHT-SIG field as specified in the IEEE 802.11ac standard (and in similar manner in some other standard such as IEEE 802.11ah) has the fields groupID and NSTS that can be used for signaling and transmitting the "backoff request", "backoff response", and "backoff modif" frames. In this alternative, the fields of the PHY layer make it possible to recover the information for transmitting to the MAC layer in order to perform processing in accordance with the invention.

In a preferred implementation, the steps of the method of the invention for transmitting data packets to an access network with stations sharing a multiband channel are determined by program instructions in the form of one or more modules incorporated respectively in electronic circuits such as chips, which may themselves be arranged in an electronic device such as a station. The method of the invention for transmitting data packets may equally well be performed when the program (or its modules) is/are loaded into a calculation member such as a processor or the equivalent with its operation then being controlled by executing the program.

Consequently, the invention also applies to a computer program (or its various modules), in particular a computer program on or in a data medium and suitable for performing the invention. The program may use any programming language, and be in the form of source code, object code, or code intermediate between source code and object code, such as in a partially compiled form, or in any other desirable form for implementing a method of the invention.

The data medium may be any entity or device capable of storing the program. For example, the medium may comprise storage means such as a read-only memory (ROM), for example a compact disk (CD) ROM or a microelectronic circuit ROM, or indeed magnetic recording means, e.g. a floppy disk or a hard disk.

Alternatively, the data medium may be an integrated circuit in which the program is incorporated, the circuit being adapted to execute or to be used in the execution of the program in question.

Furthermore, the program may be converted into a transmissible form such as an electrical or optical signal, suitable for being conveyed via an electrical or optical cable, by radio, or by other means. The program of the invention may in particular be downloaded from an Internet type network.

Thus, the invention also provides a computer program on a data medium. The program includes program instructions adapted to enable a station to perform a method of transmitting data packets to an access network with sharing of a multiband channel among stations, in accordance with the invention, when said program is loaded in and executed by a station for performing the method of the invention.

The invention also provides a data medium including program instructions adapted to enable a station to perform a method of transmitting data packets to an access network with sharing of a multiband channel among stations, in accordance with the invention, when said program is loaded in and executed by a station for performing the transmission method.

LIST OF FIGURES

Other characteristics and advantages of the invention appear more clearly on reading the following description of particular implementations, given merely as illustrative and non-limiting examples, and with reference to the accompanying drawings, in which:

FIG. 1, described with reference to the prior art, shows the CSMA-CA access mechanism to the shared channel;

DESCRIPTION OF IMPLEMENTATIONS OF THE INVENTION

The invention is described in the context of a WiFi communications network with a transmission band that corresponds to a 5 GHz band for a network in compliance with the IEEE 802.11n standard and with a signaling band that corresponds to an 868 MHz to 868.6 MHz band for a network in compliance with the IEEE 802.11ah standard. The WiFi network in question has four stations, one of which serves in particular to perform an access point function. This station is referred to below as an "access point" (AP), and it may correspond to a gateway or to a relay.

Access to the shared transmission channel of the WiFi network is conventionally of the CSMA-CA type, i.e. involving listening for a certain length of time comprising the so-called "backoff duration" specified by a count that is initialized to a value that is drawn randomly. The invention intends to eliminate identical backoff values between stations (AP and STAi) sharing the same WiFi channel to eliminate risks of collision in the transmission band.

Every station has at least one queue in which it stores packets that it needs to transmit to a remote entity. The present description assumes an infrastructure context in which transmission to a remote entity takes place via the access point AP and the shared channel.

Figure 1:
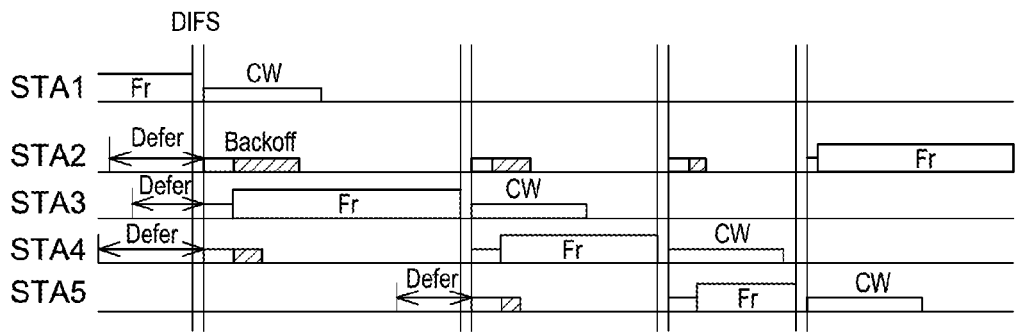
Figure 2:
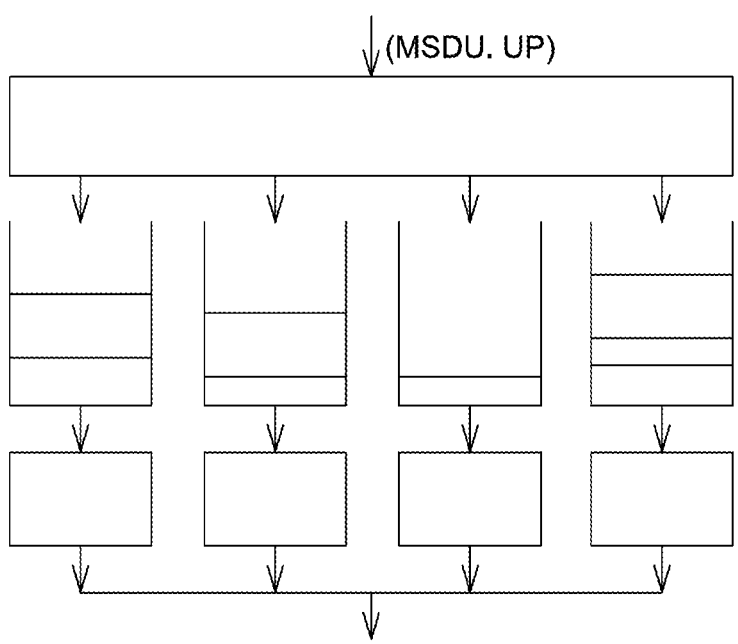
FIG. 2 shows four queues for a given station, each associated with a respective one of four data streams.

These packets are generated by an application such as voice communication, for example. The station may have several queues in which it stores packets generated by applications that are running simultaneously on the station, e.g. an Internet consultation and a voice call: a station typically has one queue per stream. FIG. 2 shows an example of four queues.

Once a packet MSDU has been put into a queue that was previously empty, an initial backoff value is drawn for associating with the queue in order to implement the channel access mechanism. Prior to accessing the channel in order to transmit the queued packets, the station defers any attempt at access by starting to decrement its backoff count from the beginning of the contention window CW. While decrementing the backoff, decrementation is suspended on each occasion that the channel is occupied by another station and for the duration of that occupation. At the end of occupation, decrementation is continued. When the backoff has been decremented to zero, transmission takes place as soon as the channel is free. A contention window CW begins after each occasion the transmission channel ceases to be occupied. Its duration is generally set as a function of the characteristics of the physical layer used by the access system and it may change as a function of the type of stream and as a function of the successes or failures during the station's previous attempts at accessing the channel. The initial backoff values are drawn from the range [0, CW].

When new data is put into the queue, a new backoff value is drawn. The station sends each new backoff value over the signaling channel.

Figure 3:
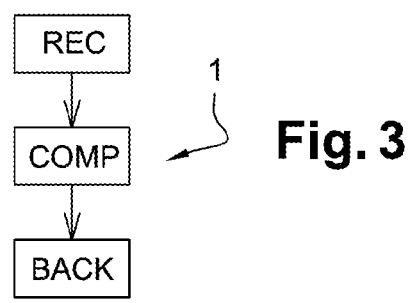
FIG. 3 is a flow chart showing the main steps of the transmission method of the invention.

FIG. 3 is a flow chart showing the main steps of the transmission method of the invention.

The method 1 comprises a reception step REC of receiving the queue counts sent successively over the signaling channel by the various stations concerning their various streams.

The method 1 has a comparison step COMP of comparing the queue counts with one another in order to detect any values that are identical.

The method 1 has a determination step BACK of determining at least one new queue decrementation value that is different from all of the others in the event of there being identical backoff values between a plurality of stations.

In a first implementation, the backoff values are compared by the access point AP.

The access point AP and the stations exchange control frames so that the access point AP and the stations STAi, for i=1, 2, etc., select the mode to be used for improving the quality of service (QoS) from the various possible modes, in association with the data transmission band.

In a first implementation, the access point AP broadcasts a backoff request over the signaling band. By way of example, there may be three destination stations STAi, for i=1 to 3. They receive this backoff request. In a particular manner, the request may specify an order in which the stations are to respond, thus providing the advantage of ensuring that the transmission band is used effectively and avoiding any risk of collision between the stations while accessing the signaling channel. This mechanism may be similar to the scheduling mechanism coordinated by the so-called "hybrid coordination function controlled channel access" (HCCA) that was introduced in the 802.11 standard and that serves to share out accesses to the channel but without the constraints of requiring needs to be returned, or to the mechanism for recovering feedback from the user channels in a MIMO multi-user context as defined in the IEEE 802.11ac standard.

The various stations STAi, i=1 to 3, respond by sending their backoff values associated with the counts of their respective queues. A station may have a plurality of queues, typically one per class of service. By way of example, service classes are signaled in the "QoS control/TID" field of the MAC header as defined in §7.1.3.5 of the 802.11e standard. The packets are labeled in association with the class of service associated therewith, it being understood that conventionally four different classes of service are distinguished: "best effort" (no particular priority); "background" (to be handled last); "voice" (requiring real time transmission); and "video" (requiring high quality transmission).

In addition, since a plurality of stations associated with an access point may all be attempting to reach it, there may be a plurality of packets for transmitting to a plurality of pieces of destination equipment, these packets being stored in one or more queues prior to being processed by the access point.

The stations send their backoff values in succession using the signaling band. In the event of there being identical values, the access point determines a new backoff value. In this implementation, the method also has a step of the access point AP sending a new backoff value over the signaling channel.

Figure 4:
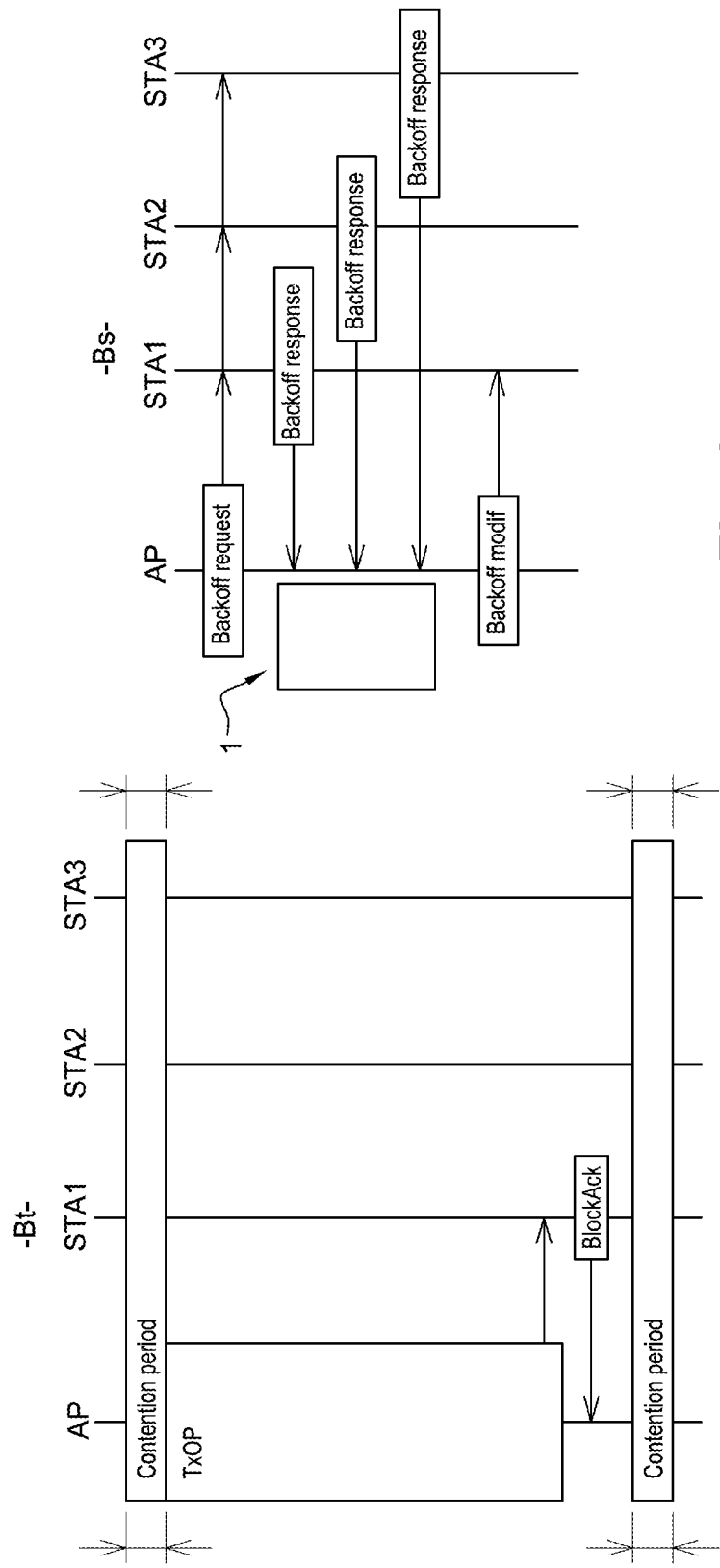
FIG. 4 shows a first implementation of a transmission method of the invention in which the comparison between backoff values is performed by the access point AP, in a particular configuration in which backoff response and processing by the access point AP take place while the transmission channel is occupied.

In a particular configuration, as shown in FIG. 4, the backoff responses and the processing by the access point AP are performed while the transmission band Bt is occupied, i.e. during a transmit opportunity (TxOP) period during which a station is occupying the data transmission band. This TxOP period is signaled with each packet transmitted over the transmission band. The access point can thus be aware of the TxOP period and can determine whether it is of sufficient duration to cover the responses of the various backoff values. If the duration is sufficient, i.e. if the duration of the TxOP is longer than the duration of the forthcoming exchanges that are to take place in the signaling band Bs for providing the backoff responses, then the access point has knowledge of the various backoff values before any new contention stage. Otherwise, the access point AP needs to take account of the contention stages that occur during the responses in order to update the response backoff values associated with the stations involved in these contention stages. Under such circumstances, the backoff response from each station includes a field specifying whether the transmitted backoff value is the backoff value after a contention period, together with a field identifying this period, if any (taking account of the beginning of backoff response transmission). If a collision is detected while the method 1 is in progress, e.g. between stations STA1 and STA2 as shown, then the AP determines a new value for the station STA1, which new value is sent in a backoff modif frame to the station STA1.

Figure 5:
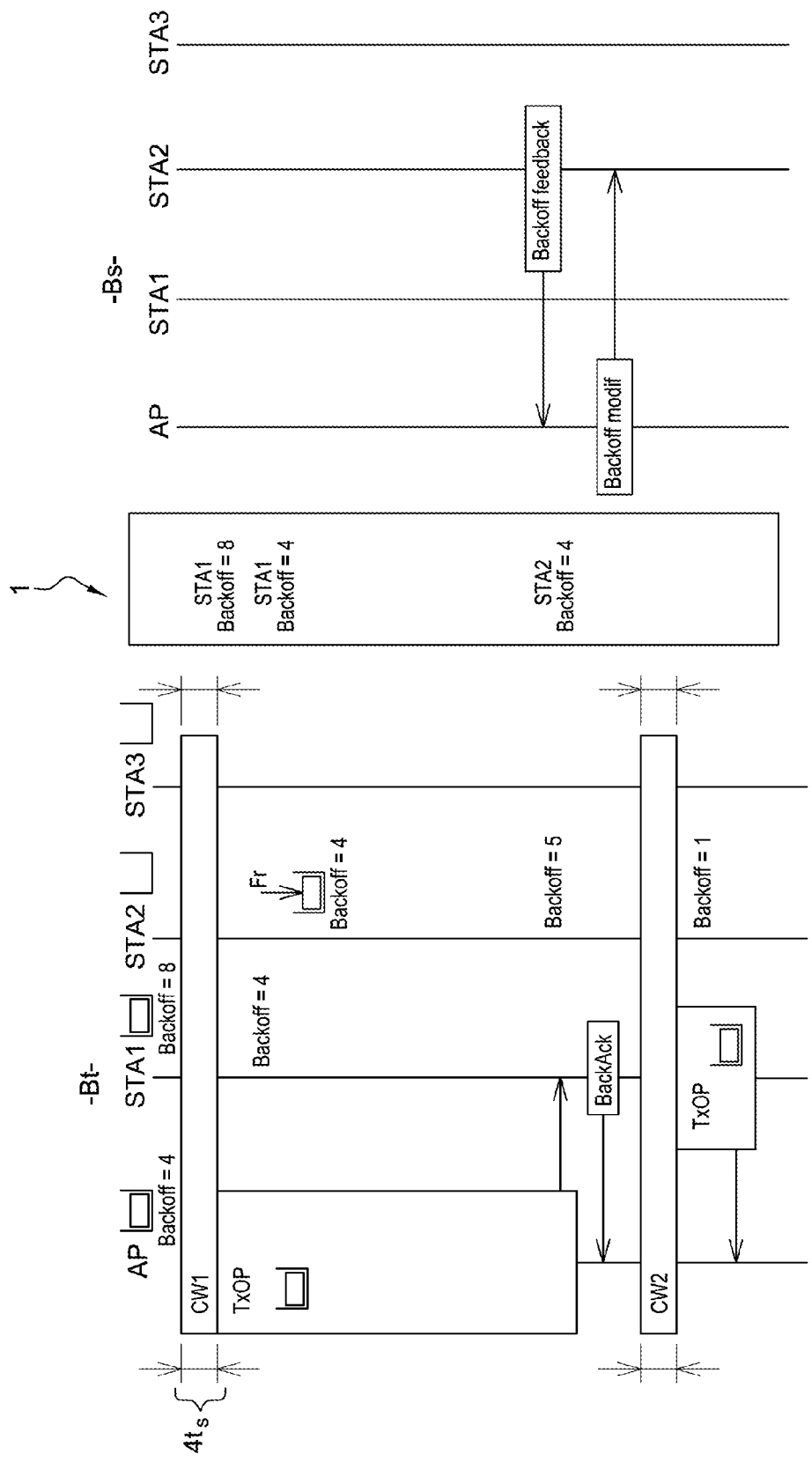
FIG. 5 shows a first implementation of a transmission method of the invention in which the comparison between the backoff values is performed by the access point AP in a particular configuration in which a station sends a backoff value in the signaling band after drawing/allocating a new backoff value for one of its streams.

In a second configuration as shown in FIG. 5, a station sends a backoff value in the signaling band after drawing/allocating a new backoff value for one of its streams. In this configuration, the access point AP compares the various backoff values while taking account of the decrementation being performed on the counts in each of the stations, since the AP received the backoff responses or feedback and in association with occupation of the data transmission band Bt.

As illustrated, the access point AP receives backoff=8 from the station STA1 before the contention window CW1. The access point AP receives Backoff feedback with backoff=4 from the station STA2 following the arrival of packets for transmission by the station STA2, after the contention window CW1.

The access point AP evaluates the possibility of collision by comparing the backoff values with each other. If values are identical, then the access point determines a new backoff value and sends this new value for the queue count via the signaling channel Bs: the access point AP forces backoff modification in order to avoid collisions.

In the illustration, the backoff values of the stations STA2 and STA1 are identical after updating the backoff value of STA1 as received by the AP before the contention window CW1. This updating consists in modifying the value as received by the amount STA1 has decremented since sending its backoff value, with this decrementation being evaluated as being determined by the four-timeslot (4 ts) duration of the contention window in this example, thus leading to the station STA1 having an updated backoff value of four. A collision can thus be expected between the stations STA1 and STA2 since their backoff values are identical. The new value of five as determined by the AP is sent to the station STA2 in a backoff modif frame.

In a second implementation, the backoff values are compared with one another by the stations.

Figure 6:
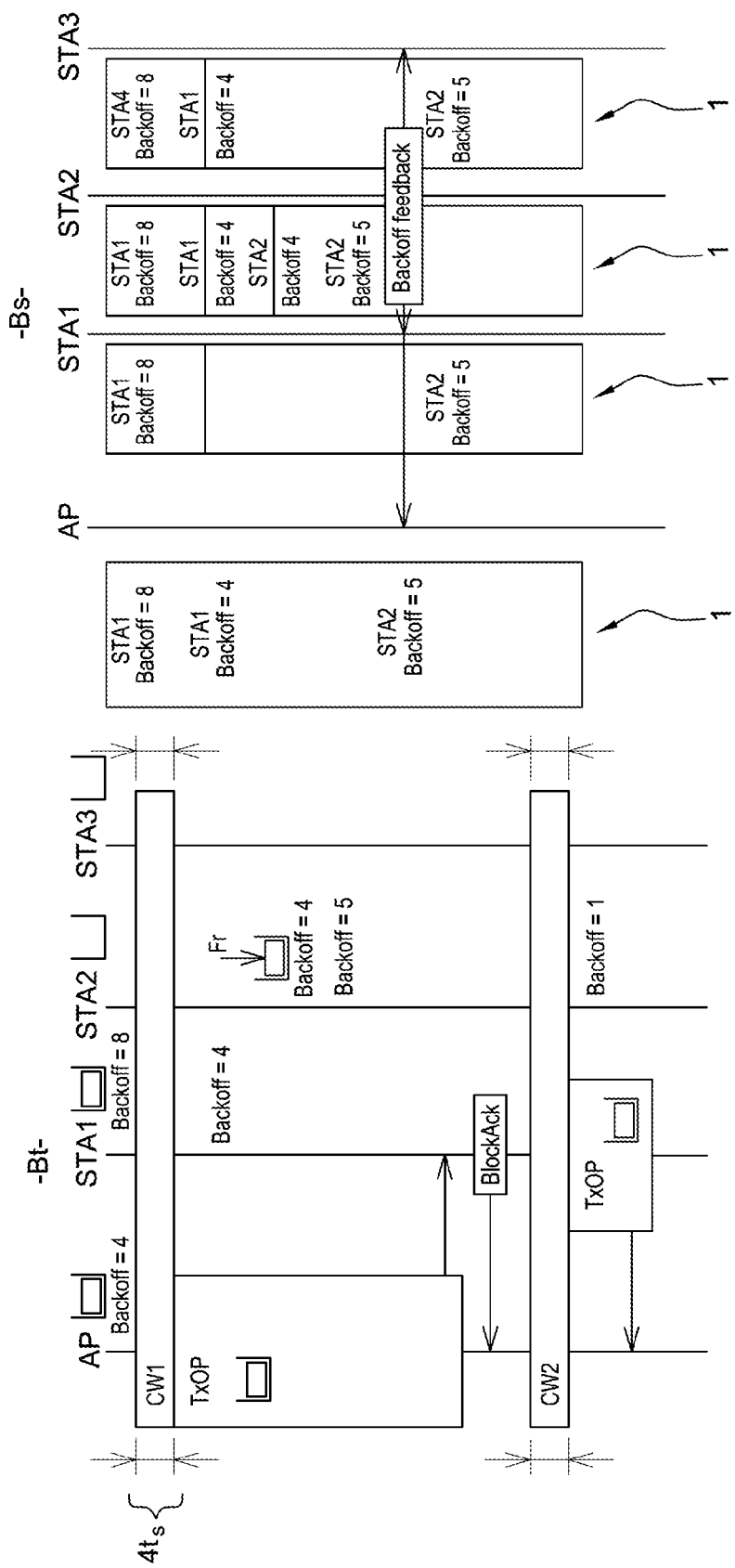
FIG. 6 illustrates a second implementation of a transmission method of the invention in which the comparison between backoff values is performed by the stations.

In the implementation shown in FIG. 6, each station uses the signaling band Bs to broadcast to the entire cell (AP and STAi for i=1 to 3), the backoff information associated with the data transmission band Bt as soon as an initial value has been allocated to a queue count associated with one of its streams.

Each of the stations, AP and STAi, for i=1 to 3, sharing the same channel receives the values broadcast by the other stations. In the illustration, before the contention window CW1, only the station STA1 broadcast a backoff value, which backoff value is equal to eight. In this example, starting from the station STA1 sending its backoff value, the decrementation performed by its counter is evaluated as being the four-timeslot (4 ts) duration of the contention window, which leads to an updated backoff value of four for the station STA1 after the contention window CW1. After this contention window CW1, the queue in the station STA2 receives packets for sending. As soon as its queue starts filling, the station STA2 draws a new backoff value, equal to four, and broadcasts it.

A receiving station can correct the received backoff values by the amount decremented by the counter since broadcasting the initial value of the backoff, by making use of information about the occupation of the transmission channel: start/end of transmission and of contention window(s). In the illustration, the station STA2 received the backoff value of eight from the station STA1 before the contention window CW1. Given the decrementation that has taken place since that value was broadcast, the station STA2 corrects that value and the corrected value for the backoff of the station STA1 is then four while the queue in the station STA2 is being filled.

Thus, a station can compare its backoff values with those it has received and corrected in order to determine whether there are any identical values. In this illustration, the station STA2 thus detects that there is a risk of collision with the station STA1, since the corrected value for the backoff of STA1 and the value for the backoff of STA2 are identical.

In the event of such identity, the station determines a new initial backoff value for its count that is different from all of the other values. In addition, in the event of a new backoff value being drawn as a result of a new packet arriving in a queue, the station can quickly determine whether there is a risk of a collision by comparing the new value with the previously received and corrected backoff values. If the value as drawn leads to a collision, it is possible to draw again or else to adjust the backoff (by adding +1 or −1 to the valued drawn by the station (in a particular implementation, it is possible to authorize only increments of +x)). As illustrated, the station STA2 consequently modifies its backoff value, e.g. by incrementing it by one, so that the value becomes five, and it verifies that this value is different from the other backoff values of which it has knowledge. After determining this new value, the station STA2 broadcasts Backoff feedback this modified value of five to the entire cell: AP, STA1, and STA3.

Figure 7:
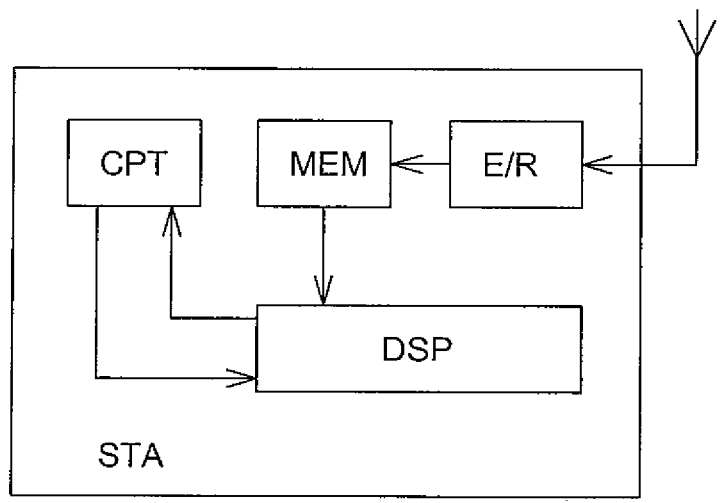
FIG. 7 is a block diagram of a simplified example structure for a station of the invention suitable for transmitting data packets.

FIG. 7 is a block diagram of a simplified structure example for a station of the invention suitable for transmitting data packets.

The station STA is intended in particular for an access network with a multiband channel being shared among various stations, there being a "transmission" first band, and a "signaling" second band, with a station accessing the channel for transmitting data of a stream after a counter has decremented a backoff value to zero.

The station STA comprises:

Transceiver means E/R for transmitting and receiving data packets via the multiband transmission channel. These means comprise two conventional transceiver systems having frequency characteristics that are adapted respectively to the transmission band and to the signaling band.

Memory means for storing queue counts, as transmitted in succession by the various stations sharing the multiband channel and relating to their own various streams. These means typically comprise memory means MEM, e.g. a register or a memory that is connected to the transceiver system tuned to the transmission band.

Comparator means for comparing the queue counts for detecting identical values between a count of the station and a count of some other station. These means typically comprise calculation means, e.g. a microprocessor or a digital signal processor (DSP) with firmware to compare the stored backoff values and the backoff values of the counters CPT in the station. These calculation means DSP are connected to queue counts CPT of the station and to the memory means MEM.

In the event of there being identical values, means for determining at least one new value for at least one queue count for which there exists a risk of collision, which value is different from all of the other values. This queue count may be contained in one of the counters of the station. These means typically comprise calculation means, e.g. a microprocessor, or a DSP, with firmware to determine at least one new backoff value. These means are connected to the queue counts of the station. In the embodiment shown, these means are the same as the comparator means, however it should be understood that the firmware of the signal processor DSP includes respective modules suitable for performing the comparison and for determining the new value. In a variant embodiment, these means may be shared between the calculation means DSP and the counter CPT: the calculation means DSP control the counter CPT to cause it to draw a new value, and the calculation means DSP continue to do that until the drawn backoff value is different from the backoff values of the other counters.

Figure 8:
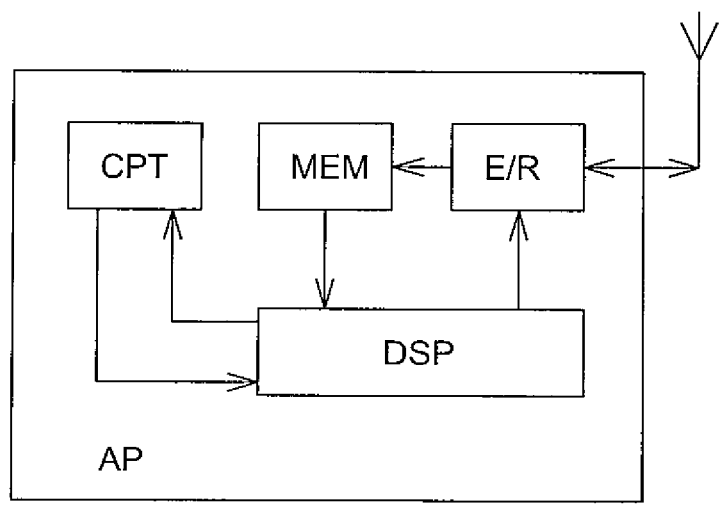
FIG. 8 is a block diagram of a simplified example structure of a station of the invention having an access point function.

FIG. 8 shows a simplified structure example for a station of the invention having an access point function. In addition to the means described with reference to the preceding figure, the station AP further comprises:

Means for broadcasting a backoff request over the signaling channel. These means are typically calculation means, e.g. a microprocessor or a DSP with firmware to generate a backoff request in a particular format as typically determined by the MAC layer used by the station, and co-operating with the transceiver system tuned to the signaling band. With reference to the figure, the same DSP can be used, the difference coming from specific firmware to enable the DSP to generate the backoff request.

Means for transmitting a new queue count value over the signaling channel to the station that has the counter in question. These means are typically calculation means, e.g. a microprocessor or a DSP with firmware to recover the new backoff value and co-operating with the transceiver system tuned to the signaling band.

Although the present disclosure has been described with reference to one or more examples, workers skilled in the art will recognize that changes may be made in form and detail without departing from the scope of the disclosure and/or the appended claims.

The invention claimed is:

1. A method of transmitting data packets to a WiFi access network with sharing of a multiband channel among WiFi stations, a first band being a "transmission" band, and a second band being a "signaling" band, a station accessing the channel for transmitting data of a stream after using a counter to decrement a backoff value, the method comprising:
   a reception step of receiving backoff count values sent successively over the signaling channel by the various stations relating to their various streams;
   a comparison step of comparing the received backoff count values with one another in order to detect identical values;
   in the event of there being identical values between a plurality of stations, a determination step of determining at least one new backoff count value that is different from all the received backoff count values; and
   a step of decrementing by a backoff counter a count value taking account of the at least one new backoff count value before a data packet transmission step.

2. The method according to claim 1 for transmitting data packets to an access network with sharing of a multiband channel among stations, one of the stations being an access point in which the reception, comparison, and determination steps take place, the method further comprising:
   a step of the access point broadcasting a backoff request; and
   a step of the access point sending the at least one new backoff count value to the station associated with the backoff count.

3. The method according to claim 2, for transmitting data packets to an access network with sharing of a multiband channel among stations, wherein value of every backoff count associated with a queue of a station, and from which the data that was previously stored therein has been sent over the transmission channel by the station, is no longer taken into account in the comparison by the access point.

4. The method according to claim 2, for transmitting data packets to an access network with sharing of a multiband channel among stations, wherein the steps of broadcasting the backoff request, of reception, of comparison, of determination, and of sending a new backoff count value as performed by the access point take place during a period in which the transmission channel is occupied by a single station.

5. The method according to claim 2, for transmitting data packets to an access network with sharing of a multiband channel among stations, wherein the access point decrements the backoff count values at each contention stage and suspends such decrementation as soon as transmission begins in the transmission channel.

6. The method according to claim 1, for transmitting data packets to an access network with sharing of a multiband channel among stations, one of the stations being an access point in which the reception, comparison, and determination steps take place, the method further comprising:
   a step of the various stations (STA1,STA2,STA3) sending backoff count values over the signaling band; and
   a step of the access point (AP) sending the at least one new backoff count value.

7. The method according to claim 1, for transmitting data packets to an access network with sharing of a multiband channel among stations, the method further comprising:
   a step of the stations broadcasting the backoff count values over the signaling band;
   a step of the stations receiving the broadcast backoff count values;
   a step of the stations evaluating the probability of collisions; and
   as a function of the probability of collisions, a step of modifying backoff count values that are identical with the at least one new backoff count value.

8. A WiFi station configured to transmit data packets to a WiFi access network with sharing of a multiband channel among various WiFi stations, a first band being a "transmission" band, and a second band being a "signaling" band, a station accessing the channel for transmitting data of a stream after using a counter to decrement a backoff value, the station comprising:
   a backoff counter having a backoff count value;
   a transceiver configured to transmit and receive data packets via the multiband transmission channel, based on the backoff count value;
   a memory storing backoff count values sent in succession by the various stations sharing the multiband channel and relating to their various streams;
   a comparator, which compares the backoff count values in order to detect values that are identical between the backoff count value of backoff counter of the station and a backoff count value of some other station;
   in the event of there being backoff count values that are identical, means for determining at least one new backoff count value for the backoff counter that is different from all the other values and setting the backoff counter to the new backoff count value; and
   wherein the backoff counter decrements the new backoff count value before the transmitter transmits the data packets.

9. The WiFi station according to claim 8, and further comprising:
   means for broadcasting a backoff request over the signaling channel; and
   means for sending the at least one new backoff count value over the signaling channel.

10. A non-transitory data medium comprising a computer program stored thereon, said program including program instructions adapted to enable a station to perform a method of transmitting data packets to a WiFi access network with sharing of a multiband channel among WiFi stations, when said program is loaded in and executed by a station for performing the method, the multiband channel including a first, "transmission" band, and a second, "signaling" band, wherein the station accesses the channel for transmitting data of a stream after using a counter to decrement a backoff value, the method comprising:
- a reception step of receiving backoff count values sent successively over the signaling channel by the various stations relating to their various streams;
- a comparison step of comparing the received backoff count values with one another in order to detect identical values;
- in the event of there being identical values between a plurality of stations, a determination step of determining at least one new backoff count value that is different from all the received backoff count values; and
- a step of decrementing by a backoff counter a count value taking account of the at least one new backoff count value before a data packet transmission step.

* * * * *

UNITED STATES PATENT AND TRADEMARK OFFICE
CERTIFICATE OF CORRECTION

PATENT NO. : 9,461,808 B2
APPLICATION NO. : 14/129142
DATED : October 4, 2016
INVENTOR(S) : Laurent Cariou et al.

Page 1 of 1

It is certified that error appears in the above-identified patent and that said Letters Patent is hereby corrected as shown below:

In the Claims

In Column 13:

In Claim 3, Line 55, add "the" before "value".

In Claim 3, Line 57, delete "the" before "data".

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*